| (12) | United States Patent | (10) Patent No.: | US 8,689,407 B2 |
|---|---|---|---|
| | Kim et al. | (45) Date of Patent: | Apr. 8, 2014 |

(54) HOSE CLAMP

(75) Inventors: Myung Hoon Kim, Gyeongsangbuk-do (KR); Cheong Yong Cho, Siheung-si (KR); Kyu Dong Park, Gyeongsangbuk-do (KR); Jin Woo Kim, Daegu (KR)

(73) Assignee: Dong-A Metal Co., Ltd., Gyeongsangbuk-Do (KR)

( * ) Notice: Subject to any disclaimer, the term of this patent is extended or adjusted under 35 U.S.C. 154(b) by 0 days.

(21) Appl. No.: 13/537,945

(22) Filed: Jun. 29, 2012

(65) Prior Publication Data

US 2013/0000083 A1 Jan. 3, 2013

(30) Foreign Application Priority Data

Jun. 29, 2011 (KR) ........................ 10-2011-0064103

(51) Int. Cl.
*F16L 33/08* (2006.01)

(52) U.S. Cl.
CPC ..................................... *F16L 33/08* (2013.01)
USPC ...................................................... 24/274 R

(58) Field of Classification Search
USPC ...... 24/274 R, 274 P, 275–286, 20 R, 20 CW, 24/20 TT, 20 LS, 19
See application file for complete search history.

(56) References Cited

U.S. PATENT DOCUMENTS

| 2,384,094 | A | * | 9/1945 | Jamie | 24/274 R |
|---|---|---|---|---|---|
| 3,296,674 | A | * | 1/1967 | Meshulam Avram M .. | 24/274 R |
| 4,221,030 | A | * | 9/1980 | Bernede | 24/274 R |
| 4,300,270 | A | * | 11/1981 | Sauer | 24/274 R |
| 4,308,648 | A | * | 1/1982 | Fay | 24/274 R |
| 5,138,747 | A | * | 8/1992 | Oetiker | 24/20 R |
| 5,544,392 | A | * | 8/1996 | Oetiker | 24/20 CW |
| 7,389,568 | B2 | * | 6/2008 | Crockett et al. | 24/274 R |

FOREIGN PATENT DOCUMENTS

| EP | 361256 A1 | * | 4/1990 |
|---|---|---|---|
| JP | 2000274575 A | * | 10/2000 |

* cited by examiner

*Primary Examiner* — Robert J Sandy

(74) *Attorney, Agent, or Firm* — Lowe Hauptman & Ham, LLP

(57) ABSTRACT

A hose clamp includes: a clamp body having a plurality of screw holes passing therethrough; a coupling housing disposed at one side of the clamp body and into which an opposite side of the clamp body is inserted; and a coupling screw rotatably disposed in the coupling housing and engaged with the screw holes of the clamp body inserted within the coupling housing, wherein the clamp body includes a compensating means including at least one compensation bead formed at one side of the clamp body for resiliently fastening a hose by a degree by which a diameter of the hose is decreased so as to firmly tighten the hose. The hose clamp can prevent the compensation means from being deformed over the resilient area, so that the compensation means is not deformed over the resilient area.

6 Claims, 15 Drawing Sheets

Fig. 3
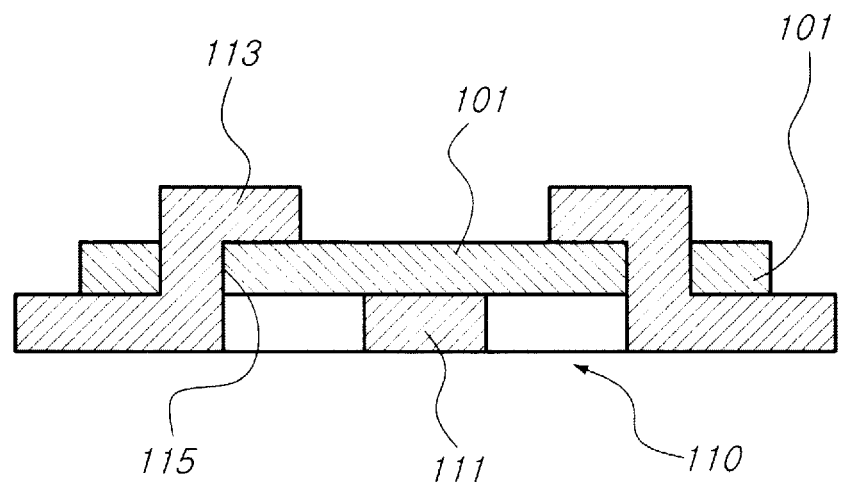
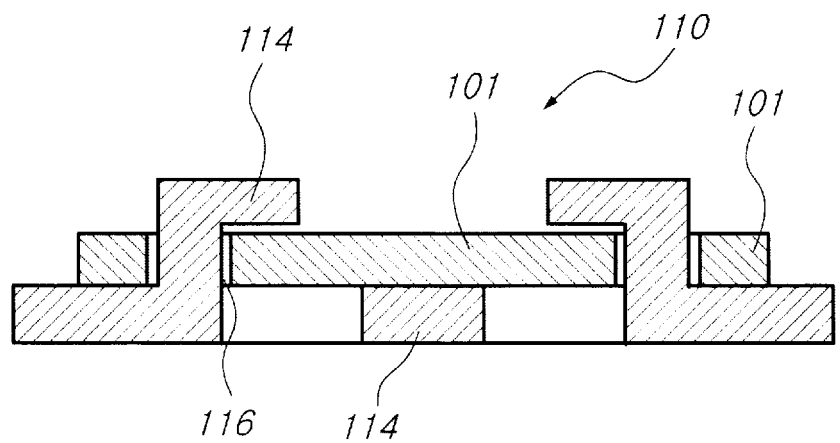

Fig. 11
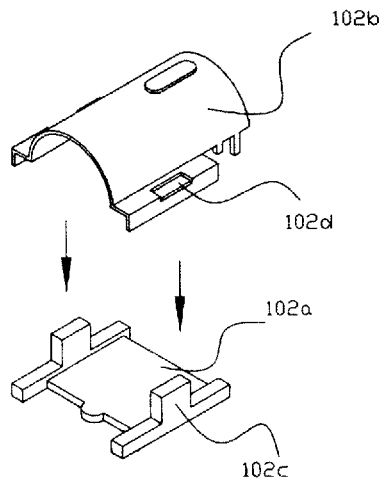
[a]
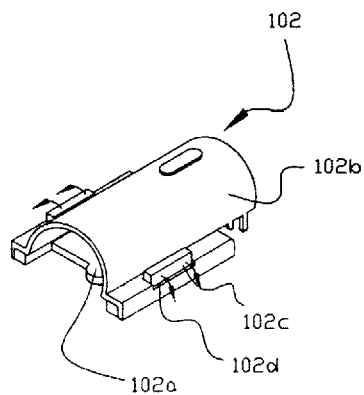
[b]
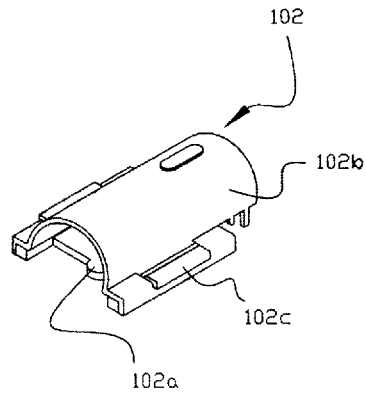
[c]

Fig. 13
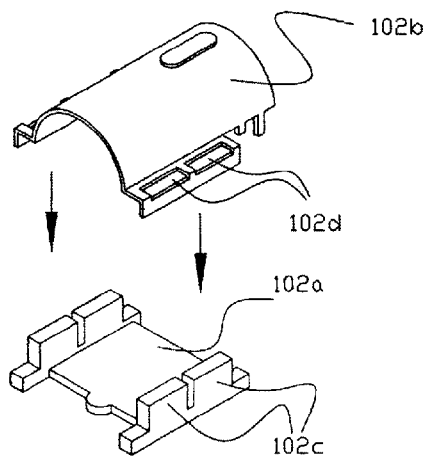
[a]
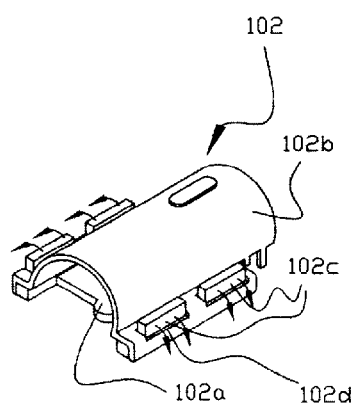
[b]
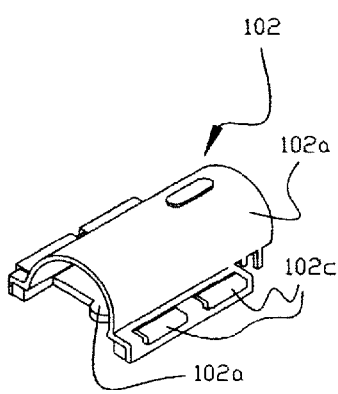
[c]

Fig. 14
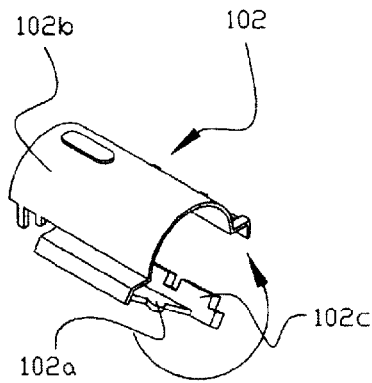
[a]
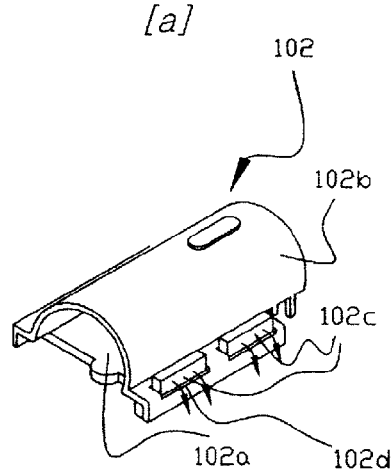
[b]
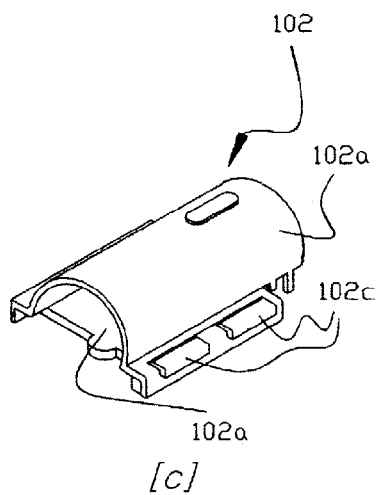
[c]

Fig. 15
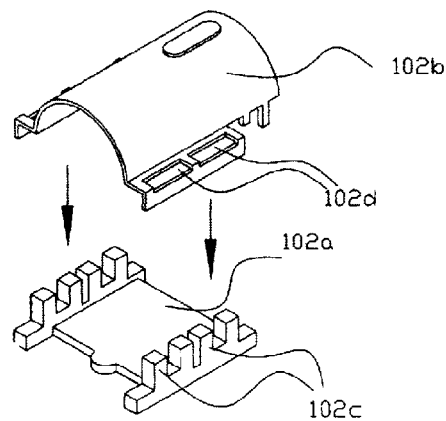
[a]
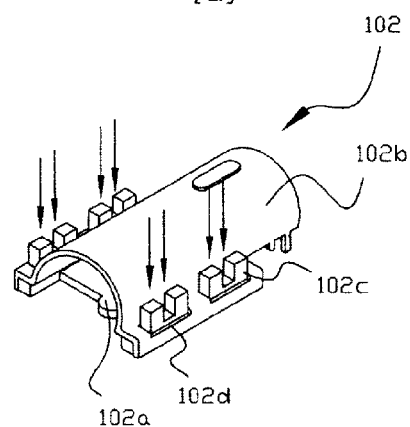
[b]
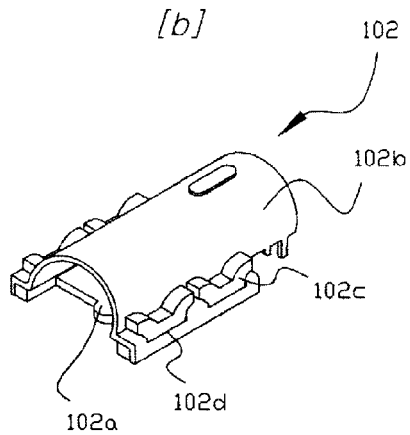
[c]

Fig. 16
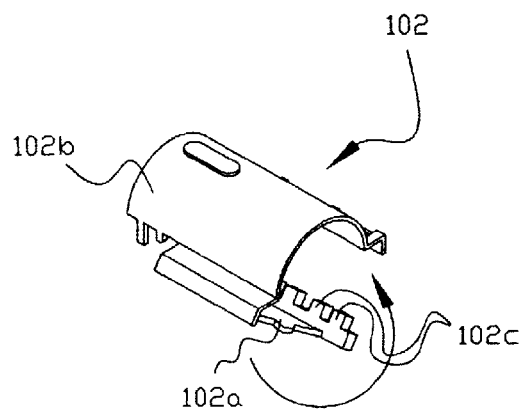
[a]
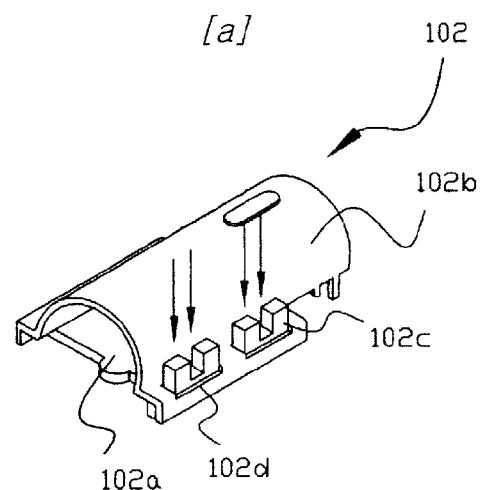
[b]
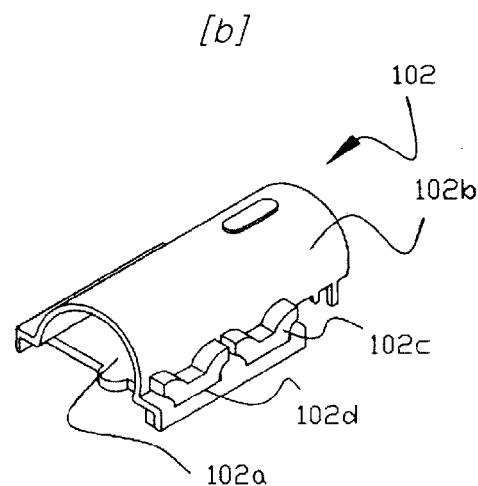
[c]

//<br>
HOSE CLAMP

CROSS REFERENCE TO RELATED APPLICATION

This application claims the priority of Korean Patent Application No. 10-2011-0064103 filed on Jun. 29, 2011 in the KIPO (Korean Intellectual Property Office), the disclosure of which is incorporated herein in their entirety by reference.

BACKGROUND OF THE INVENTION

1. Field of the Invention

The present invention relates to a hose clamp, and more particularly to an improved clamp, which has a compensation function of maintaining a coupling force even if a diameter of a hose is decreased due to aging according to long-term use and prevents the hose from penetrating into the clamp and thus being damaged.

2. Description of the Prior Art

A hose clamp is used for fastening a hose, which is used for making fluid or air flow into a brake, an air conditioning system, a power steering apparatus, or an engine compartment or is connected for the flow of fluid or air in other industrial places, and thus preventing the hose from being separated.

There are various types of conventional hose clamps for use, and a clamp, which has a compensation function of compensating a diameter of a hose and prevents the clamp from losing a fixing force (coupling force) when a diameter of the hose is changed due to the long-term use, has been recently developed and used.

The clamp includes a clamp body surrounding the hose, a coupling housing coupled to the clamp body, and a coupling screw. The clamp body includes a compensation means so as to prevent the clamp from losing its fixing force. Accordingly, when the fixing force of the clamp is lost, it is possible to reinforce the fixing force using the compensation means.

However, such a hose clamp has a problem in that the clamp should be coupled to the hose through being deformed in a resilient area of the compensation means when the hose is coupled to the hose clamp. However, a user cannot know information about the resilient area of the compensation means, so the hose clamp is often deformed in a plastic deformation area over the resilient area and then is coupled to the hose.

Further, the screw holes, etc. formed in the clamp body pressurize an outer surface of the hose when the coupling of the hose clamp is coupled to the hose, to generate a problem of damage of the hose.

SUMMARY OF THE INVENTION

Accordingly, the present invention has been made to solve the above-mentioned problems occurring in the prior art, and the present invention provides a hose clamp having the following aspects.

First, the present invention provides a hose clamp, in which when a compensation means is deformed when a hose is coupled to the hose clamp, the compensation means is not deformed over a resilient area.

Second, the present invention provides a hose clamp, by which a hose is prevented from being damaged by the clamp body when the hose is coupled to the hose clamp.

Third, the present invention provides a hose clamp, by which a portion where the hose clamp interferes with the hose is minimized when the hose is coupled to the hose clamp, thereby making the hose be easily coupled to the hose clamp.

Fourth, the present invention provides a hose clamp having a more simple construction, thereby making it possible to reduce the manufacturing costs.

The problems to be solved in the present invention are not limited to the aforementioned problems and another problem to be solved will be clearly understood by those skilled in the art from the following description.

In accordance with an aspect of the present invention, there is provided a hose clamp including: a clamp body having a plurality of screw holes passing therethrough; a coupling housing disposed at one side of the clamp body and into which an opposite side of the clamp body is inserted; and a coupling screw rotatably disposed in the coupling housing and engaged with the screw holes of the clamp body inserted within the coupling housing.

According to an embodiment of the present invention, the clamp body includes a compensating means including at least one compensation bead formed at one side of the clamp body for resiliently fastening a hose by a degree by which a diameter of the hose is decreased so as to firmly tighten the hose.

According to an embodiment of the present invention, the hose clamp further includes a plastic deformation prevention means for preventing the compensation bead from being plastically deformed and the hose from penetrating between the clamping body and the coupling housing or into the screw holes and thus being damaged.

According to an embodiment of the present invention, the plastic deformation prevention means includes a circular arc-shaped prevention band having a size large enough to cover and contact the screw holes of the clamp body, a recess formed between the clamp body and the coupling housing, and the compensation bead, and a pair of fixing pins formed at one side of the compensation bead on the prevention band and a pair of guide pins formed at an opposite side of the compensation bead on the prevention band, and the clamp body has a pair of fixing pin holes formed at positions corresponding to the fixing pins and into which the fixing pins are inserted and a pair of guide holes formed at positions corresponding to the guide pins and into which the guide pins are inserted.

According to an embodiment of the present invention, the guide holes have a same length as a distance by which all the compensation beads formed in the clamp body are spread out maximally so as not to be plastically deformed when the clamp body is coupled to the hose.

According to an embodiment of the present invention, the coupling housing includes a lower body coupled to the clamp body and an upper body coupled to the lower body, and the lower body and the upper body are integrally formed or separately formed and then coupled to each other.

According to an embodiment of the present invention, when the lower body is coupled to the upper body, the lower body includes a coupling pin formed at one side thereof and protruding upward and the upper body includes a coupling hole formed at one side thereof and into which the coupling pin is inserted, so that the coupling pin is inserted into the coupling hole and then is bent when the lower body and the upper body are coupled to each other.

According to an embodiment of the present invention, the upper body includes a press piece formed at one side thereof and protruding downward to press one side of the clamp body passing through the coupling housing.

According to an embodiment of the present invention, the upper body further includes a reinforcing rib formed at one side thereof to prevent the upper body from being deformed when the coupling screw rotates.

According to an embodiment of the present invention, opposite sides of the clamp body preferably protrude more than a central portion of the clamp body in order to prevent an end of the clamp body from being inserted into the screw holes when an opposite end of the clamp body is inserted within the coupling housing.

Accordingly, the hose clamp according to the present invention has an advantage of restricting a deformation range of the compensation means so as to prevent the compensation means from being deformed over the resilient area, so that the compensation means is not deformed over the resilient area. Further, the hose clamp according to the present invention prevents the screw holes formed in the clamp body from being in direct contact with an outer surface of the hose, thereby making it possible to minimize the damage of the hose. Further, the coupling housing within which the clamp body is inserted has a press protrusion such that the screw holes of the clamp body are easily engaged with the coupling screw of the coupling housing. Further, the hose clamp according to the present invention prevents one end of the clamp body from being caught by the screw holes of the clamp body when the hose is coupled to the clamp body, so that the hose can be more easily and conveniently coupled to the clamp body.

The effects of the present invention are not limited to the aforementioned effects and another effect will be clearly understood by those skilled in the art from the following description.

BRIEF DESCRIPTION OF THE DRAWINGS

The above and other objects, features and advantages of the present invention will be more apparent from the following detailed description taken in conjunction with the accompanying drawings, in which:

FIG. 3 is a sectional view illustrating the hose clamp taken along lines III-III and III'-III' of FIG. 1;

FIGS. 11 (a),(b),(c) to FIGS. 16 (a),(b),(c) are respectively, sequential perspective views illustrating a coupling housing of the hose clamp and operation views of a coupled coupling housing of the hose clamp according to other embodiments of the present invention;

DETAILED DESCRIPTION OF THE EXEMPLARY EMBODIMENTS

Hereinafter, a hose clamp according to the present invention will be described with reference to the accompanying drawings in detail.

Figure 1:
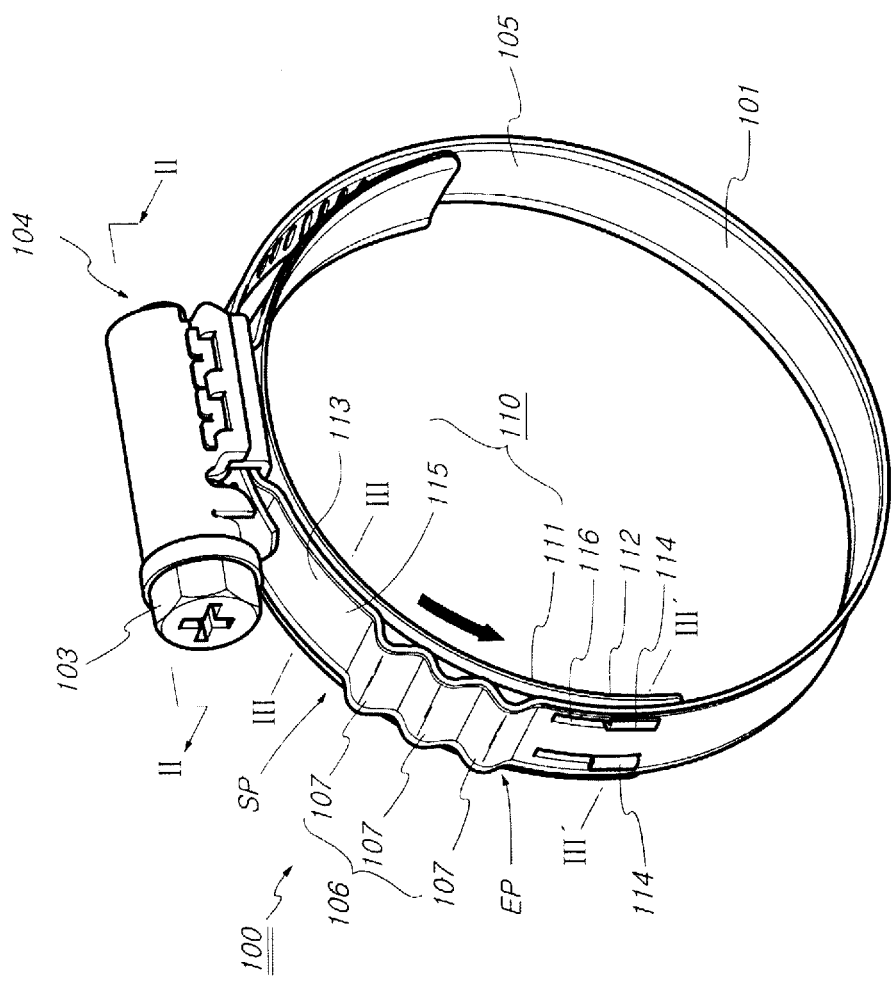
FIG. 1 is a perspective view illustrating a hose clamp according to an embodiment of the present invention.
Figure 2:
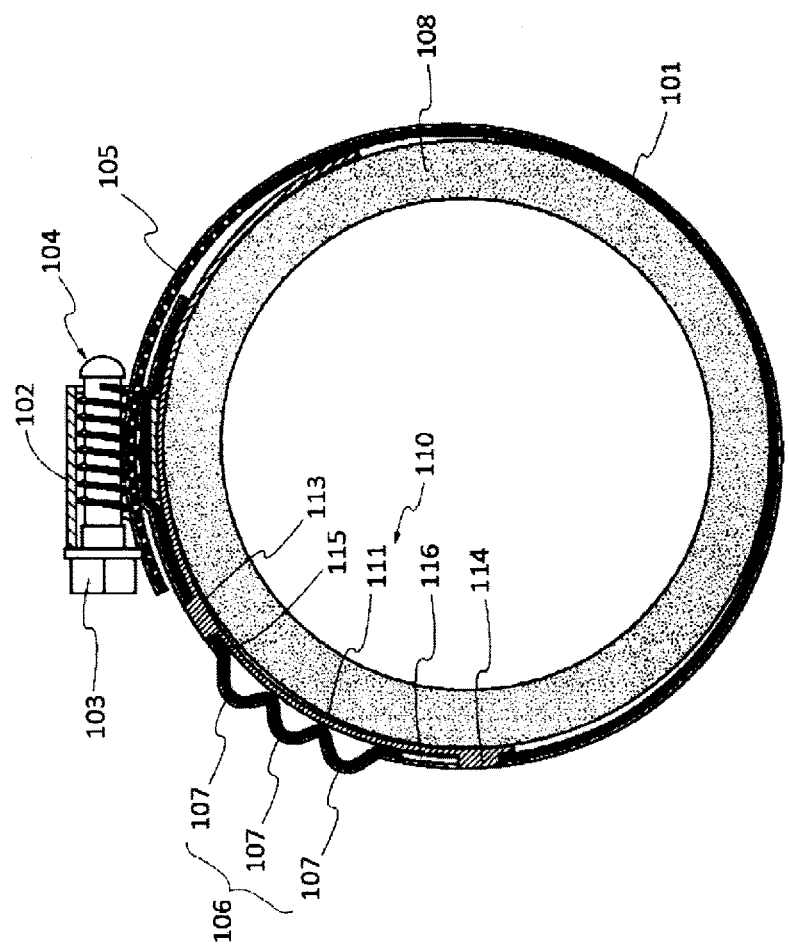
FIG. 2 is a sectional view illustrating the hose clamp taken along line II-II of FIG. 1.

FIG. 1 is a perspective view illustrating a hose clamp according to an embodiment of the present invention, FIG. 2 is a sectional view illustrating the hose clamp taken along line II-II of FIG. 1, and FIG. 3 is a sectional view illustrating the hose clamp taken along lines III-III and III'-III' of FIG. 1.

Figure 4:
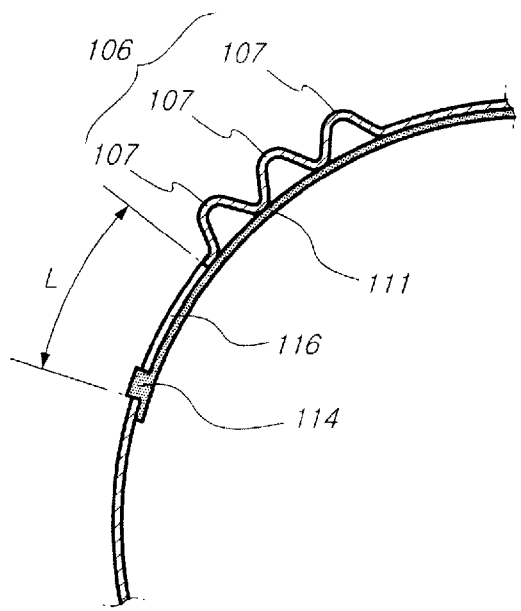
FIG. 4 is a sectional view illustrating a partial clamp body of the hose clamp of FIG. 1.
Figure 5:
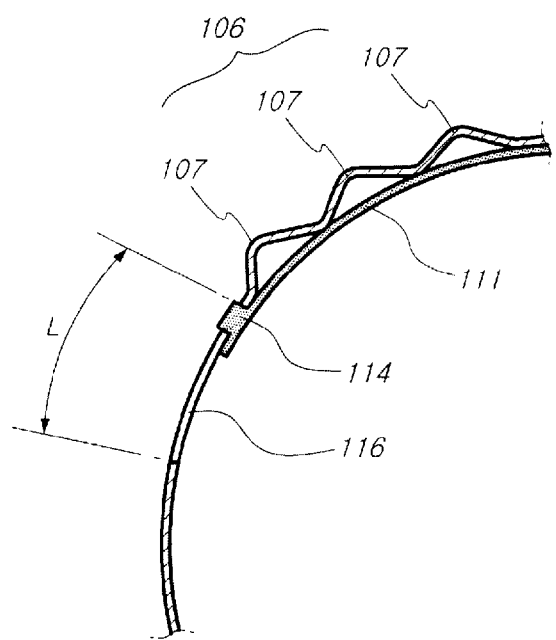
FIG. 5 is a sectional view illustrating a partial clamp body of the hose clamp in a state where the hose clamp is coupled to the hose according to the embodiment of the present invention.
Figure 6:
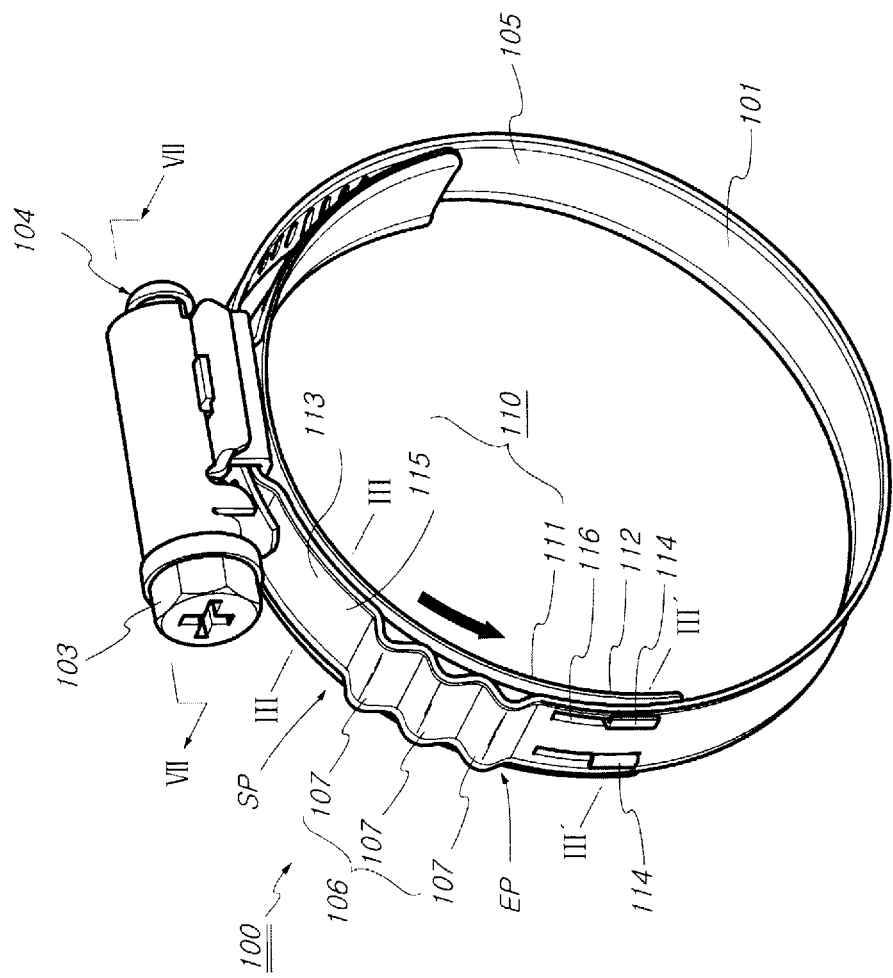
FIG. 6 is a perspective view illustrating a hose clamp according to another embodiment of the present invention.
Figure 7:
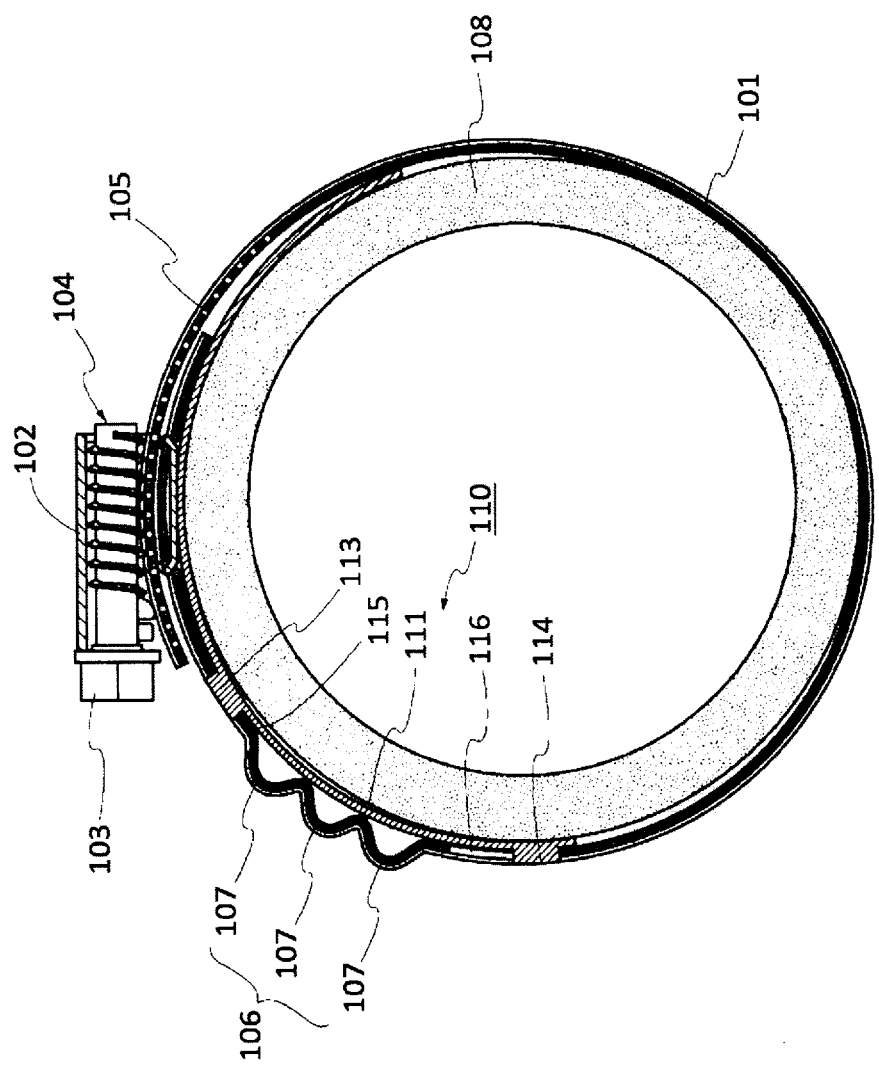
FIG. 7 is a sectional view illustrating the hose clamp taken along line VII-VII of FIG. 6.

FIG. 4 is a sectional view illustrating a partial clamp body of the hose clamp of FIG. 1, FIG. 5 is a sectional view illustrating a partial clamp body of the hose clamp in a state where the hose clamp is coupled to the hose according to the embodiment of the present invention, FIG. 6 is a perspective view illustrating a hose clamp according to another embodiment of the present invention, and FIG. 7 is a sectional view illustrating the hose clamp taken along line VII-VII of FIG. 6.

A general hose clamp 100 includes a clamp body 101 manufactured by circularly bending a plate member which is made of a stainless steel material, has a predetermined width, and has resiliency.

A coupling housing 102 is fixed to one end of the clamp body 101 to be coupled to a coupling screw 104 having a head 103 for the use of a tool.

The coupling housing 102 and the coupling screw 104 may have a shape illustrated in FIGS. 1 and 2. Further, the coupling housing 102 and the coupling screw 104 may have a shape capable of enhancing a coupling force and a shape making the coupling housing 102 hold a neck portion of the coupling screw 104 as illustrated in FIGS. 6 and 7.

The coupling screw 104 is engaged with screw holes 105 formed inward along a predetermined length at an opposite end of the clamp body 101. The screw holes 105 are pulled and pushed by rotation and reverse rotation of the coupling screw 104 in such a manner that a diameter of the clamp body 101 is increased or decreased, so that it is possible to clamp or unclamp a hose.

The clamp body 101 includes a compensation means 106 for resiliently fastening the hose by a degree by which a diameter of the hose is decreased so as to firmly tighten the hose when the diameter of the hose is decreased due to the long-term use at one side thereof.

The compensation means 106 includes one or more semi-circle-shaped compensation beads 107 formed in a circumferential direction of the clamping body 101. The compensation means 106 is spread out when fastening the hose 108 and compensates for a degree by which a diameter of the hose 108 is decreased by its restoration force and fastens the hose 108 when the hose is aged.

The hose clamp according to the present invention further includes a plastic deformation prevention means 110 for preventing the compensation bead 107 from being plastically deformed, losing a resiliency, and failing to be restored to an original state, and preventing the hose 108 from penetrating between the clamp body 101 and the coupling housing 102 and into the screw holes 105 and thus being damaged.

The plastic deformation prevention means 110 includes a circular arc-shaped prevention band 111 formed of a plate and contacting an inner surface of the clamp body 101.

It is preferred that the prevention band 111 has a size large enough to cover the screw holes 105 formed in the clamp body 101, a recess formed between the clamp body 101 and the coupling housing 102, or the compensation beads 107.

The prevention band 111 includes a guide rim (not shown) accommodating the clamp body 181 and being bent inward (in a direction of the clamp body) or outwardly (in a direction opposite to the clamp body) at an edge thereof to make the clamp body 101 and the prevention band 111 be in a stable state.

As illustrated in FIG. 1, the prevention band 111 includes a pair of fixing pins 113 and a pair of guide pins 114 bent and protruding outward at a start position SP and an end position EP of the prevention beads 107, respectively.

The clamp body 101 includes fixing pin holes 115. The fixing pin holes 115 may be formed at one side or an opposite side of the coupling body. The fixing pins 113 pass through the fixing pin holes 115 and then bent while facing each other or being opposed to each other, to make the clamp body 101 be coupled to the prevention band 111 and fasten the clamp body 101 and the prevention band 111 such that the clamp body 101 and the prevention band 111 do not move.

The clamp body 101 has guide holes 116 having a predetermined length L. The guide pins 114 pass through and are inserted within the guide holes 116 and then bent while facing each other or being opposed to each other. In this case, the bent guide pins 114 are movable within the guide holes 116.

The length L of the guide hole 116 has a same length as a distance by which all the compensation beads 117 formed in the clamp body 101 are spread out maximally so as not to be plastically deformed when the clamp body 101 is coupled to the hose 108. Accordingly, the guide holes 116 prevent the compensation beads 107 from being further deformed and thus plastically deformed while causing no hindrance to the compensation beads 107 to be spread out when the clamp body 101 is coupled to the hose 108.

An in-use state of the hose clamp 100 to which the technology of the present invention is applied will be described.

A diameter of the clamp body 101 is increased by rotating the coupling screw 104 engaged with the coupling housing 102 of the clamp 100 in a release direction by using a coupling tool, such as a screw driver, the hose 108 is accommodated within the clamp body 101, and then the hose 108 is fastened through the rotation of the coupling screw 104 in a fastening direction.

In this process, the coupling screw 104 is engaged with the screw holes 105 formed in the clamp body 101 so that the diameter of the clamp body 101 may be decreased and increased.

When the hose 108 is coupled to the clamp body 101 to be fastened, the semicircle-shaped compensation beads 107 formed in the clamp body 101 exert a coupling force by resiliency while being spread out by the coupling force in a direction of a right angle (in a circumferential direction of the hose) with respect to an axial center of the hose 108.

When a diameter of the hose 108 is decreased due to the aging of the hose 108 according to the long-term use compared to the firmly fastened state of the hose 108, the compensation beads 107 formed in the clamp body 101 generate a force to be restored to the original state thereof. Accordingly, a diameter of the clamp body 101 is decreased by the restoration force and the decrease diameter of the hose 108 is compensated.

As described above, when the hose 108 is coupled to the clamp body 101, the compensation beads 107 are spread out from a semicircle shape to a substantial flat shape. In this process, the plastic deformation prevention means 110 prevents the compensation beads 107 from being completely spread out, to prevent the compensation beads 107 from being plastically deformed.

When the compensation beads 107 are spread out by a coupling force in a state where the fixing pins 113 are inserted within the fixing pin holes 115 and the guide pins 114 are movably inserted within the guide holes 116, the guide holes 106 move in a direction of an arrow of FIG. 1 with respect to the guide pins 114 in a state where the guide pins 114 are inserted within the guide holes 116.

Accordingly, the guide pins 114 move from position C to position B within the guide holes 116 so that the compensation beads 107 cannot be spread out any further and finally the deformation of the compensation beads 107 and the movement of the clamp body 101 are ceased.

In this case, the length L of the guide hole 116 is the same length as a distance by which all the compensation beads 107 formed in the clamp body 101 are spread out maximally so as not to be plastically deformed, so that the guide hole 116 prevents the compensation beads 107 from being plastically deformed.

When a diameter of the hose 108 is decreased due to the aging of the hose 108, a diameter of the clamp body 101 is decreased by a restoration force of the compensation beads 107 to fasten the hose 108. In this process, the guide pins 114 within the guide holes 116 move from position B to position A, so that there occurs no hindrance for the decrease of a diameter of the hose 108.

Further, as described above, the prevention band 111 has a size large enough to cover a position where the clamp body 101 is coupled (fixed) to the coupling housing 102, as well as the compensation beads 107 and the screw holes 105 formed in the clamp body 101. Accordingly, even if the hose 108 is exposed to a high temperature and high pressure, the prevention band 111 may prevent the hose 108 from penetrating into a recess or a gap formed between the clamp body 101 and the coupling housing 102.

In the processing of the coupling of the hose to the hose clamp, the present invention can prevent the compensation beads from being plastically deformed to smoothly perform a compensation function and prevent the hose from penetrating into a recess or a gap between the clamp body and the coupling housing and thus being damaged.

Figure 8:
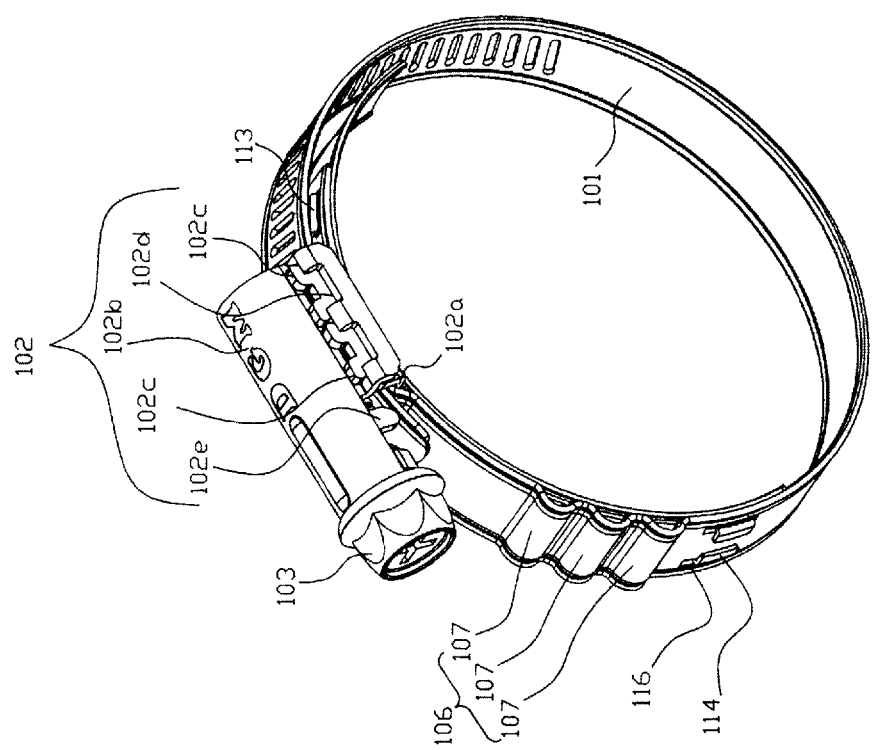
FIG. 8 is a perspective view illustrating a hose clamp according to another embodiment of the present invention.

Further, referring to FIG. 8 which is a perspective view illustrating a hose clamp according to another embodiment of the present invention, the coupling housing 102 includes a lower body 102a coupled to the clamp body 101 and an upper body 102b coupled to the lower body 102a.

In this case, the lower body 102a and the upper body 102 may be integrally formed as illustrated in FIG. 8, or separately formed and then coupled to each other as illustrated in FIGS. 1 and 6, to form the coupling housing 102.

Figure 9:
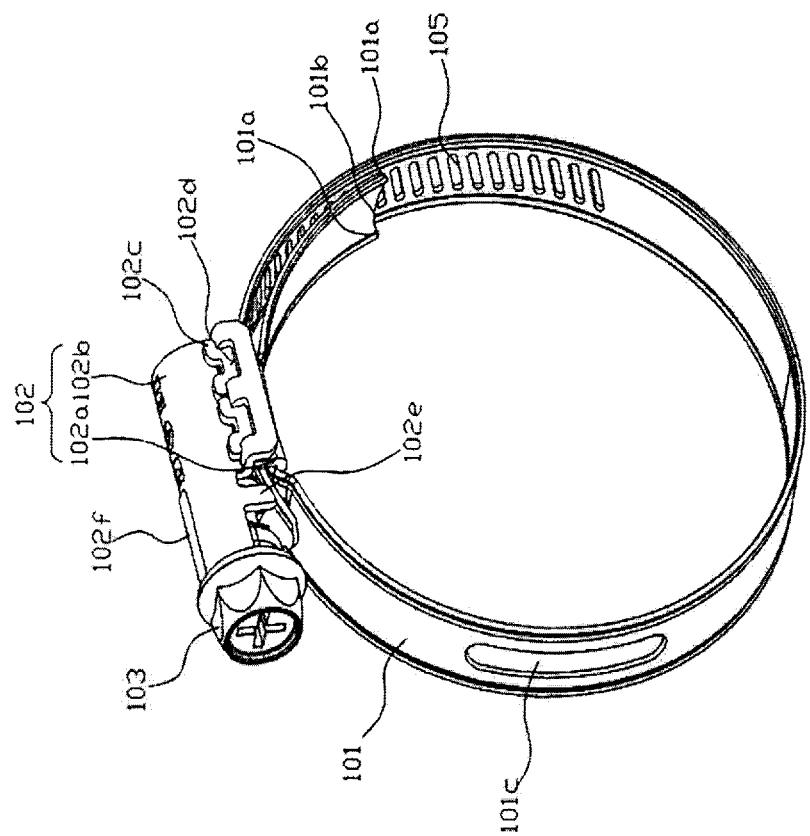
FIG. 9 is a perspective view illustrating a hose clamp according to another embodiment of the present invention.
Figure 10:
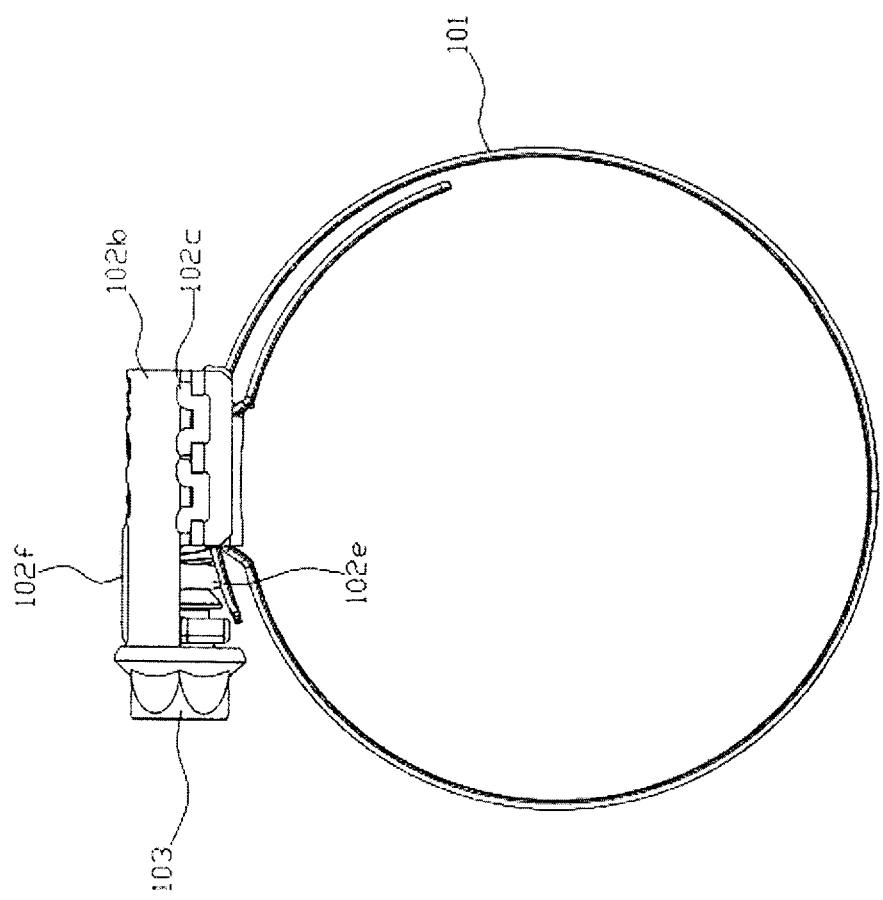
FIG. 10 is a side view illustrating the hose clamp of FIG. 9.

That is, as illustrated in FIGS. 9 and 10 which are a perspective view and a side view illustrating a hose clamp according to another embodiment of the present invention, respectively, coupling pins 102c may be formed upward at one side of the lower body 102a and coupling holes 102d within which the coupling pins 102 are inserted may be formed at one side of the upper body 102. Accordingly, when the lower body 102 is coupled to the upper body 102b, the coupling pins 102c are inserted within the coupling holes 102d and then bent so that the lower body 102 is coupled to the upper body 102b.

Further, as illustrated in FIGS. 1, 6, 8, and 9, illustrating the hose clamp according to the embodiment of the present invention, a press piece 102e is formed downward at one side of the upper body 102b, to press one side of the clamp body 101 passing through the coupling housing 102.

As illustrated in FIG. 9, the press piece 102e presses downward the one side of the clamp body 101 passing through the coupling housing 102, to make the coupling screw 104 be easily engaged with the screw holes 105 of the clamp body 101.

Further, as illustrated in FIGS. 9 and 10, the upper body 102b may include a reinforcing rib 102f for reinforcing strength of the upper body 102 at one side thereof.

As described above, the coupling housing 102 includes the lower body 102a and the upper body 102b, and the coupling screw 104 is rotatably engaged between the lower body 102 and the upper body 102b.

The coupling screw 104 is rotatably engaged with the screw holes 105 as described above, so that an external force is applied to the coupling screw 104 when the coupling screw 104 is engaged with the screw holes 105. Accordingly, the external force applied to the coupling screw 104 is transferred to the coupling housing 102 to cause the deformation of the coupling housing 102. Such deformation is mainly concentrated to the upper body 102 which is not coupled to the clamp body 101.

Accordingly, it is preferred that the upper body 102 includes the reinforcing rib 102f as illustrated in FIGS. 9 and 10 so as to prevent the upper body 102 from being deformed.

Further, as illustrated in FIG. 9, opposite sides 101a of the clamp body 101 preferably protrude more than a central portion 101b of the clamp body 101 in order to prevent an end of the clamp body 101 from being inserted into the screw hole 105 when an opposite end of the clamp body 101 is inserted within the coupling housing 102, such that the ends of the clamp body 101 are not interfered with each other when the hose 108 is coupled to the clamp body 101.

Figure 12:
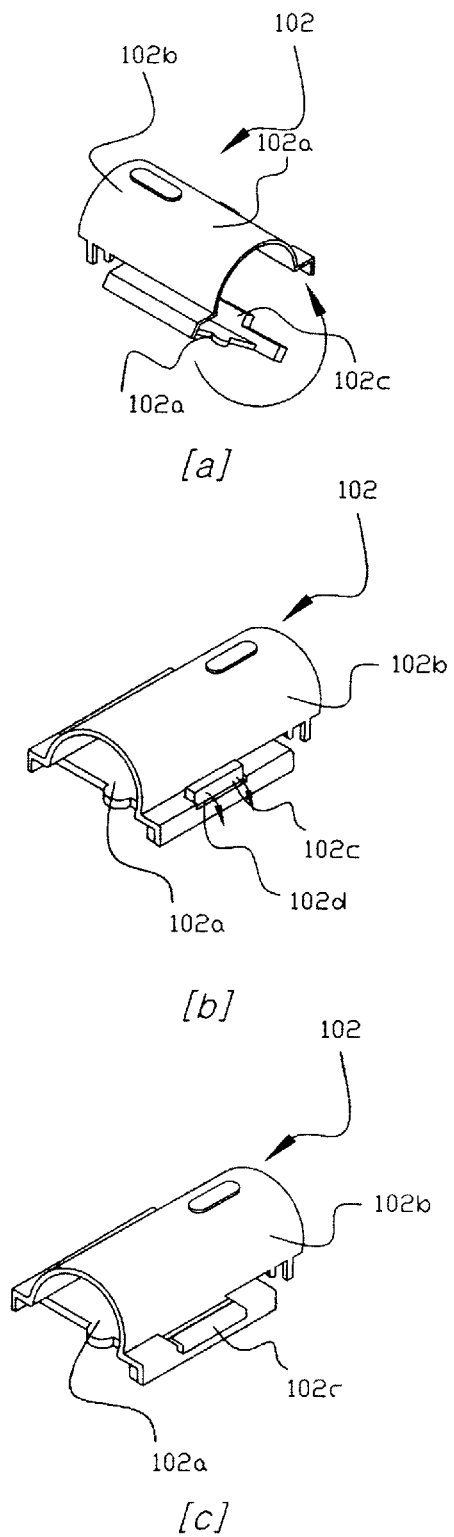

Referring FIGS. 11 (a),(b),(c) to FIGS. 16 (a),(b),(c) respectively, which are sequential perspective views illustrating a coupling housing of the hose clamp and operation views of a coupled coupling housing of the hose clamp according to other embodiments of the present invention, the lower body 102a and the upper body 102b of the coupling housing 102 are separately formed and then coupled to each other as illustrated in FIGS. 11, 13, and 15, or one side of the lower body 102a is connected to the upper body 102b to be coupled to each other as illustrated in FIGS. 12, 14, and 16.

In this case, the various shapes of coupling pins 102c are formed in the lower body 102a and are inserted within the coupling holes 102d of the upper body 102b to be bent.

The exemplary embodiments and the accompanied drawings of the present invention have been described for simply describing a part of the technical spirit of the present invention. Accordingly, the embodiments in the present specification have been described for the purpose of the illustration of the technical spirit of the present invention, not for the purpose of the limitation, so that those skilled in the art will appreciate that the scope of the technical spirit of the present invention is not limited by the described embodiments.

Further, it shall be construed that all modifications and specific embodiments easily conceivable by those skilled in the art within the scope of the technical spirit included in the specification and drawings of the present invention belong to the scope of the right of the present invention.

What is claimed is:

1. A hose clamp comprising:
    a clamp body having a plurality of screw holes passing therethrough;
    a coupling housing which is disposed at one side of the clamp body and into which an opposite side of the clamp body is inserted; and
    a coupling screw rotatably disposed in the coupling housing and engaged with the screw holes of the clamp body inserted within the coupling housing,
    wherein the clamp body comprises a compensating means including at least one compensation bead formed at one side of the clamp body for resiliently fastening a hose by a degree by which a diameter of the hose is decreased so as to firmly tighten the hose,
    wherein the hose clamp further comprises a plastic deformation prevention means for preventing the compensation bead from being plastically deformed and the hose from penetrating between the clamping body and the coupling housing or into the screw holes and thus being damaged,
    wherein the plastic deformation prevention means comprises:
        a circular arc-shaped prevention band having a size large enough to cover and contact the screw holes of the clamp body, a recess formed between the clamp body and the coupling housing, and the compensation bead,
        a pair of fixing pins formed at one side of the compensation bead on the prevention band, and
        a pair of guide pins formed at the other side of the compensation bead on the prevention band, and
    wherein the clamp body further comprises a pair of fixing pin holes formed at positions corresponding to the fixing pins and into which the fixing pins are inserted and a pair of guide holes formed at positions corresponding to the guide pins and into which the guide pins are inserted.

2. The hose clamp as claimed in claim 1, wherein the guide holes have a same length as a distance by which all the compensation beads formed in the clamp body are spread out maximally so as not to be plastically deformed when the clamp body is coupled to the hose.

3. The hose clamp as claimed in claim 1, wherein the coupling housing comprises a lower body coupled to the clamp body and an upper body coupled to the lower body, and the lower body and the upper body are integrally formed or separately formed and then coupled to each other.

4. The hose clamp as claimed in claim 3, wherein
    the lower body is coupled to the upper body,
    the lower body comprises a coupling pin formed at one side thereof and protruding upward, and
    the upper body comprises a coupling hole formed at one side thereof, so that the coupling pin is inserted into the coupling hole and then is bent when the lower body and the upper body are coupled to each other.

5. The hose clamp as claimed in claim 3, wherein the upper body comprises a press piece formed at one side thereof and protruding downward to press one side of the clamp body passing through the coupling housing.

6. The hose clamp as claimed in claim 3, wherein the upper body further comprises a reinforcing rib formed at one side thereof to prevent the upper body from being deformed when the coupling screw rotates.

* * * * *